(12) United States Patent
Toba et al.

(10) Patent No.: US 7,942,477 B1
(45) Date of Patent: May 17, 2011

(54) SEAT PROVIDED WITH ELECTRIC OR ELECTRONIC EQUIPMENT

(75) Inventors: Eiji Toba, Reynoldsburg, OH (US); Masaaki Yasuda, Tochigi (JP); Shigeru Endo, Tochigi (JP); Kazutomo Isonaga, Saitama (JP); Tsutomu Fukui, Saitama (JP); Nobuhiro Koyota, Saitama (JP); Takashi Inoh, Saitama (JP)

(73) Assignees: TS TECH Co., Ltd., Saitama (JP); HONDA MOTOR Co., Ltd., Tokyo (JP)

( * ) Notice: Subject to any disclaimer, the term of this patent is extended or adjusted under 35 U.S.C. 154(b) by 0 days.

(21) Appl. No.: 11/910,352

(22) PCT Filed: May 14, 1999

(86) PCT No.: PCT/JP99/02517
§ 371 (c)(1),
(2), (4) Date: Nov. 14, 2008

(87) PCT Pub. No.: WO99/58023
PCT Pub. Date: Nov. 18, 1999

(30) Foreign Application Priority Data

May 14, 1998 (JP) .................................... 10/150681
May 14, 1998 (JP) .................................... 10/150683
May 31, 1998 (JP) .................................... 10/166311

(51) Int. Cl.
*A47C 7/72* (2006.01)
*A47C 7/62* (2006.01)

(52) U.S. Cl. ................ 297/180.12; 297/217.3

(58) Field of Classification Search .............. 297/217.3, 297/180.12, 180.1
See application file for complete search history.

(56) References Cited

U.S. PATENT DOCUMENTS 4,865,379 A * 9/1989 Aoki et al. ............... 297/180.12
7,134,715 B1 * 11/2006 Fristedt et al. ........... 297/180.12

* cited by examiner

*Primary Examiner* — Milton Nelson, Jr.
(74) *Attorney, Agent, or Firm* — Dann, Dorfman, Herrell and Skillman, P.C.

(57) ABSTRACT

There is disclosed a seat that comprises a trim cover including a sheet of covering material and a wadding layer, a padding member covered with the cover, a seating surface section formed by a portion of the cover and a portion of the padding member, and electric or electronic equipment, the equipment including planar equipment bodies and accessories, the wadding layer including a first wadding member laminated onto the entire sheet, and second wadding members formed separately from the first wadding member and mounted to predetermined regions of the portion of the padding member which forms the seating surface section in cooperation with the portion of the cover, the bodies being disposed on the second wadding members, and the padding member being covered by the cover in such a manner that the second wadding members having the bodies disposed thereon are combined with the first wadding member.

5 Claims, 6 Drawing Sheets

SEAT PROVIDED WITH ELECTRIC OR ELECTRONIC EQUIPMENT

TECHNICAL FIELD

The present invention relates to an improvement of a seat provided with electric or electronic equipment, in which planar bodies of the equipment together with accessories of the equipment are mounted to portions of a padding member of the seat which positionally correspond to a seating surface of the seat, and the pad member is covered with a trim cover which comprises a covering sheet and wadding members, one of which is laminated with the covering sheet.

BACKGROUND ART

As this kind of seat provided with electric or electronic equipment, there may be exemplified a seat provided with a heater. In the seat, bodies of the heater are provided at the seat by attaching the heater bodies directly to a padding member of the seat or by attaching the heater bodies onto an inner surface of a wadding member being one of elements constituting a trim cover of the seat, or by causing the heater bodies to be interposedly held between two layers of a wadding member laminated with a covering sheet of the trim cover, to thereby cause the heater bodies to be integrated with the trim cover.

Figure 11:
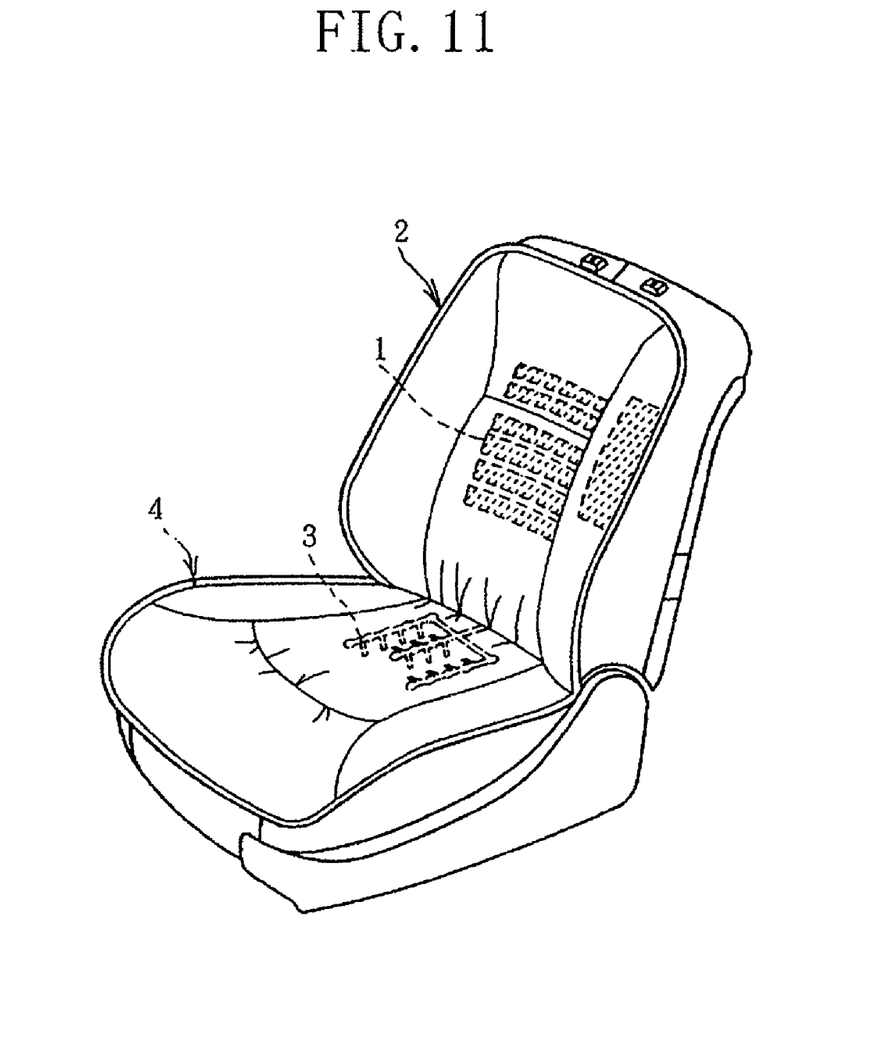
FIG. 11 is a schematic perspective view of the entire seat according to the present invention.

In addition to the seat provided with the heater, there has been proposed a seat which is shown in FIG. 11 and provided with a control system for controlling the inflation and noninflation of an airbag, in which a planar antenna 1 is provided in a seating surface portion of a seat back 2 and a pressure sensor 3 is provided in a seating surface portion of a seat cushion 4. In this seat, an electrostatic capacity which is generated at the time that a person sits on the seat is sensed, whereby the presence or absence of the person is judged and it is judged whether the person is a grown-up person or a child, and the inflation and noninflation of the airbag is controlled.

In this seat provided with the antenna for sensing the occupant, a high-accuracy positioning of the planar antenna is required, it is necessary to position the antenna so as to cause it to become close to a surface of the seating surface portion of the seat back, taking the output of the antenna into account, and a comfortable seating feeling equivalent to that given to the occupant by a seat which is not provided with the antenna is required to be given to the occupant.

When the planar antenna is mounted directly to a padding member of the seat in the same manner as in the above-mentioned seat provided with the heater, the requirements for accuracy of mounting position of the planar antenna and the comfortable seating feeling equivalent to that given to the occupant by the seat which is not provided with the antenna are satisfied but the requirements for a distance from the antenna to a surface of a seating surface section of the seat is not satisfied.

Moreover, when the planar antenna is mounted to an inner surface of a wadding member of a trim cover, if the wadding member is thick, the comfortable seating feeling can be given to the occupant, but the requirements for the accuracy of the mounting position of the planar antenna and the distance from the antenna to the surface of the seating surface section of the seat are not satisfied. On the other hand, when the wadding member is thin, the requirements for the distance from the antenna to the surface of the seating surface section of the seat is satisfied, but the requirements for the accuracy of the mounting position of the antenna and the seating feeling are not satisfied.

Moreover, the antenna is interposedly held between two layers of the wadding member of the trim cover, the requirements for the distance from the antenna to the surface of the seating surface section of the seat and the comfortable seating feeling are satisfied but the requirements for the accuracy of the mounting position of the antenna are not satisfied.

Therefore, all of the requirements for mounting the antenna are not satisfied by the above-mentioned processes for mounting the heater.

In the seat provided with the heater, in addition to the heater bodies, accessories such as thermostats are provided. The accessories are received within concave portions formed in the padding member, whereby a protruding feeling given to the occupant by the accessories is lessened.

In a condition where the accessories such as thermostats are received in the concave portions of the padding member, the padding member is covered by the trim cover which comprises the covering sheet and the wadding member laminated with the covering sheet. However, unless the wadding member of the trim cover has an enough thickness, a feeling of physical disorder is given to the occupant by the concave portions. Moreover, the concave portions are formed in the padding member so as to be widely extended, the concave portions will be deformed inwardly, to thereby also give the feeling of physical disorder to the occupant. Therefore, arranging positions of the accessories are limited to portions of the seat which are hard to give the feeling of physical disorder to the occupant.

SUMMARY OF THE INVENTION

It is an object of the present invention to provide a seat with electric or electronic equipment, in which the requirements for accuracy of mounting positions of planar equipment bodies of the electric or electronic equipment, distances from the planar equipment bodies to a surface of a seating surface section of the seat, and a comfortable seating feeling equivalent to that given to an occupant by a seat which is not provided with the electric or electronic equipment are all satisfied.

It is another object of the present invention to provide a seat with electric or electronic equipment, in which the requirements for accuracy of mounting positions of planar equipment bodies of the electric or electronic equipment and a comfortable seating feeling are satisfied and the planar equipment bodies can be arranged close to a surface of a seating surface section of the seat.

It is still another object of the present invention to provide a seat with electric or electronic equipment, in which if accessories of the electric or electronic equipment are provided in a padding member of the seat, a feeling of physical disorder can be prevent from being given to an occupant by the accessories, and there are no limitations to an installation location of the electric or electronic equipment and a thickness of a wadding material layer of a trim cover of the seat.

BEST MODE FOR CARRYING OUT THE INVENTION

Figure 1:
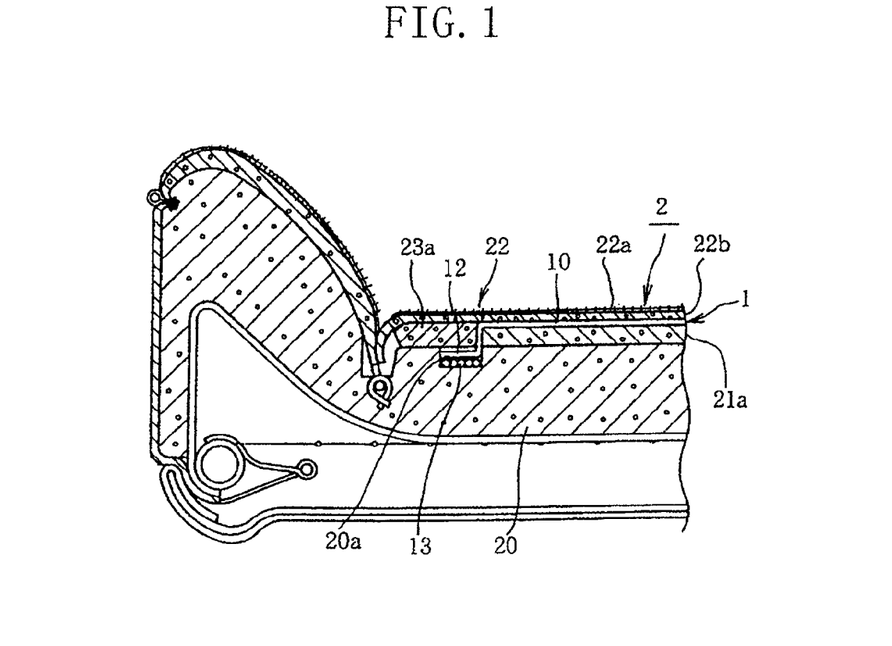
FIG. 1 is a schematic fragmentary sectional view of a seat with electric or electronic equipment, according to an embodiment of the present invention.

A seat according to an embodiment of the present invention will be discussed hereinafter with reference to the accompanying drawings. Referring to FIG. 1, there is illustrated a seat according to the embodiment of the present invention, which is provided with a control system for controlling the inflation and noninflation of an airbag. Like the seat shown in FIG. 11, the seat according to the embodiment of the present invention is equipped with a planar antenna 1 provided in a seating surface section of a seat back 2 which is formed by a portion of a trim cover 22 of the seat back 2 and a portion of a padding member 20 of the seat back 2, and a pressure sensor 3 provided in a seating surface section of a seat cushion 4 (see FIG. 11), whereby the control system is formed in which an electrostatic capacity that is produced at the time that a person sits on the seat is sensed, it is judged whether the person is present or absent and is a grown-up person or a child, and the inflation and noninflation of the airbag is controlled.

Figure 2:
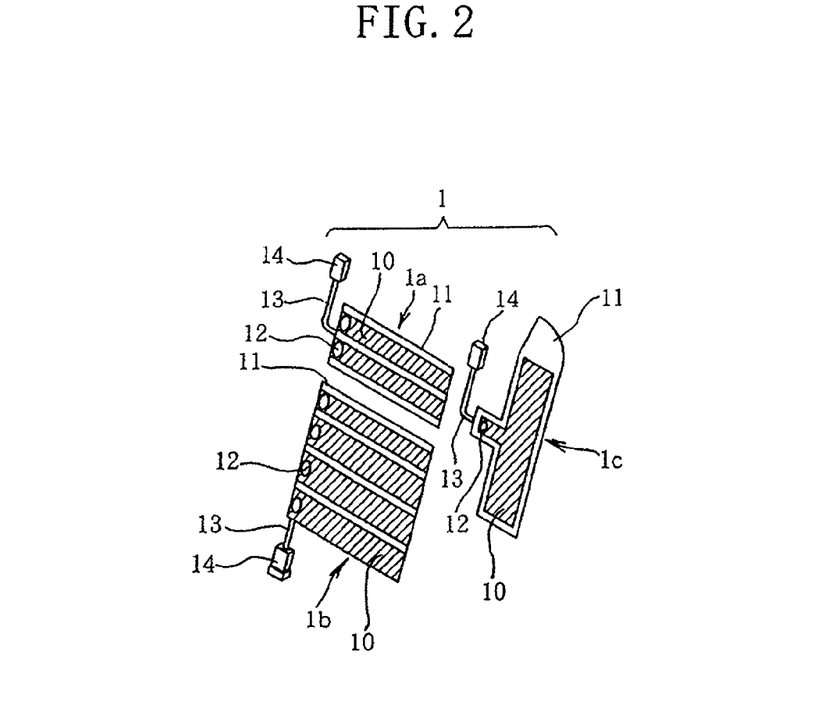
FIG. 2 is a schematic perspective view of a planar antenna constituting the electric or electronic equipment shown in FIG. 1.

Referring to FIG. 2, the planar antenna 1 has first, second, and third antenna elements 1a, 1b, 1c, each of which comprises an antenna body 10 for sensing the electrostatic capacity, and an antenna base cloth 11 integrated with the antenna body 10. More particularly, the first antenna element 1a is to be provided in an upper portion of the seating surface section of the seat back, the second antenna element 1b is to be provided in a lower portion of the seating surface section of the seat back, and the third antenna element 1c is to be provided in a surface portion of a bank section of the seating surface section which is adjacent a side portion of a vehicle body. The planar antenna 1 further includes, as accessories thereof, a harness 13 led out from a terminal 12 of each of the antenna bodies 10, and a coupler 14 attached to an end of the harness 13. The planar antenna 1 is provided in the seating surface section of the seat back 2 with the first, second, and third antenna elements 1a, 1b, 1c being arranged in the trim cover 22 of the seat back 2 (see FIG. 1), and with the harnesses 13 led out from the terminals 12 being received within storage spaces 20a, 20b, 20c (see FIGS. 4 and 5) provided in the padding member 20 of the seat back 2.

Figure 3:
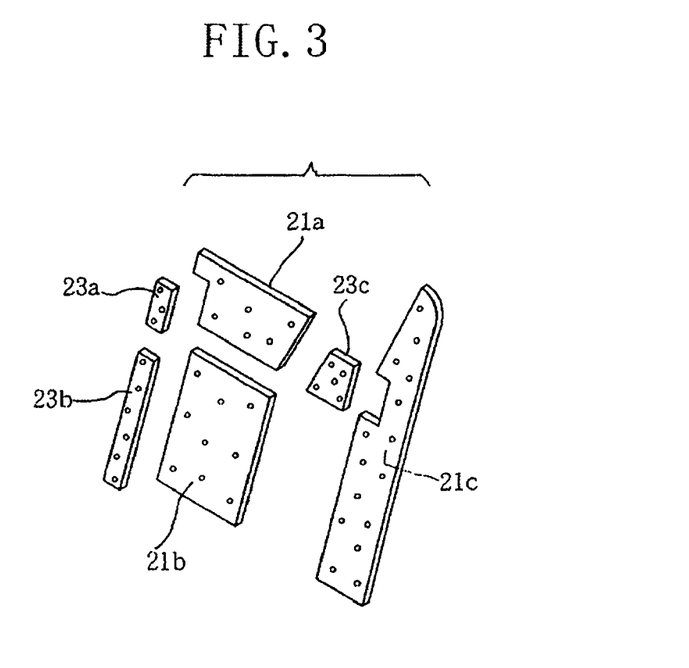
FIG. 3 is a schematic perspective view of second and third wadding members which the seat of FIG. 1 includes.

As shown in FIG. 1, the trim cover 22 of the seat back 2 comprises a sheet 22a of covering material and a layer of wadding material, such as urethane slab or the like. The layer of wadding material comprises a first wadding member 22b laminated with the entire sheet 22a of covering material, second wadding members 21a, 21b, 21c (see FIG. 3) on which the antenna elements 1a, 1b, 1c are to be respectively mounted, and third wadding members 23a, 23b, 23c (see FIG. 3) for covering the storage spaces in which the harnesses 13 of the antenna elements 1a to 1c are received. The second and third wadding members are formed separately from the first wadding member. The second and third wadding members are to be bonded onto the padding member 20 and are to be combined with portions of the first wadding member 22b which will be discussed in greater detail hereinafter. The antenna elements 1a, 1b, 1c are to be fixedly bonded onto the second wadding members 21a, 21b, 21c, respectively. The second wadding members 21a to 21c are formed so as to have areas which allow the antenna elements 1a to 1c to be fixedly bonded on the corresponding wadding members 21a, 21b, 21c. The antenna elements 1a, 1b, 1c are to be interposed between the corresponding wadding members 21a, 21b, 21c and the first wadding member 22b.

The first wadding member 22b which is laminated with the covering sheet 22a generally has a thickness of about 12 mm. The portions of the first wadding member 22b with which the second and third wadding members are to be combined are made thin. Each of the second and third wadding members may be formed so as have about half the entire thickness of the wadding layer of the trim cover 22. In this case, a thickness of each of the second and third wadding members, and a thickness of each of the thin portions of the first wadding member 22a with which the second and third wadding members are to be combined are substantially equal. Preferably, each of the second wadding members 21a to 21c and third wadding members 23a to 23c is formed so as to have a thickness more than the thicknesses of the thin portions of the first wadding member 22b laminated with the covering sheet 22a.

In the illustrated embodiment, the thin portions of the first wadding member 22b laminated with the covering sheet 22a are formed so as to have thicknesses of about 3 mm in order that the planar antenna 1 is allowed to be arranged close to a surface of the seating surface section, and the second wadding members 21a to 21c, to which the antenna elements 1a to 1c are to be bonded, and the third wadding members 23a to 23c, are formed so as to have thicknesses of about 8 mm in order that the shapes of the wadding members 21a to 21c and 23a to 23c can be retained. The above-mentioned setting of the thickness of the first wadding member 22b is applied to the only portions of the first wadding member 22b which positionally correspond to the second and third wadding members. The remaining portions of the first wadding member have the same thicknesses of about 12 mm as wadding layer of this kind commonly has. The portions of the first wadding member 22b which positionally correspond to the second and third wadding members may be formed thin by causing the portions of the first wadding member 22b to be made concave.

Figure 4:
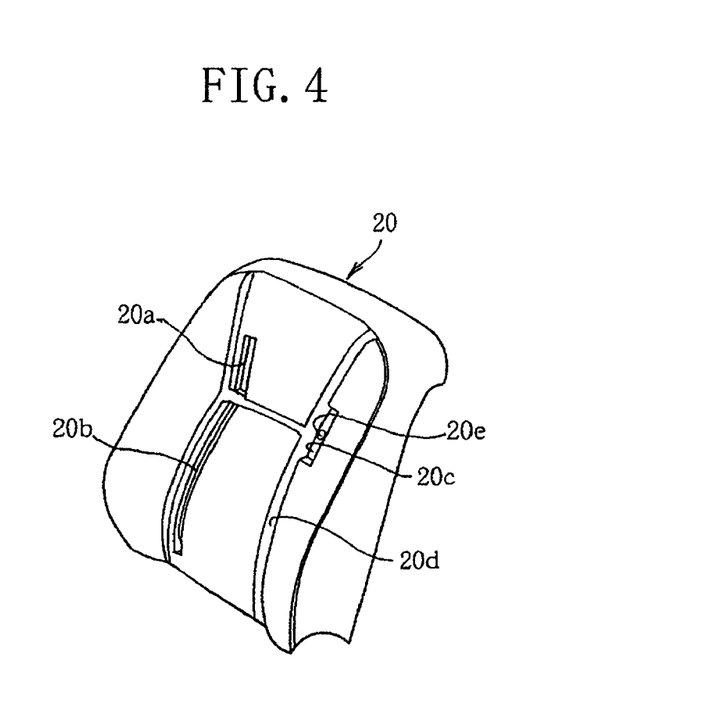
FIG. 4 is a schematic perspective view of a padding member, as viewed from the right side, which the seat of FIG. 1 includes.
Figure 5:
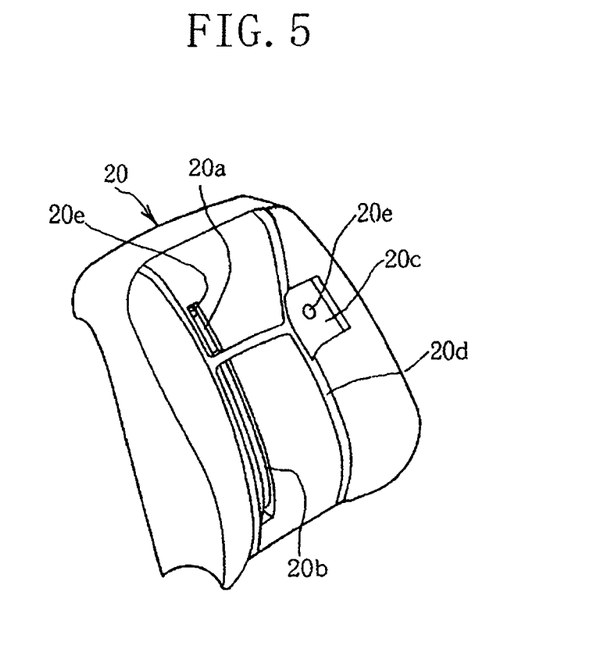
FIG. 5 is a schematic perspective view of the padding member of FIG. 4, as viewed from the right side.

Referring to FIGS. 4 and 5, the padding member 20 has the storage spaces 20a to 20c for receiving the accessories of the planar antenna 1. The storage spaces 20a to 20c are formed by causing portions of the padding member 20 to be made concave. The storage spaces 20a to 20c are formed so as to have shapes which allow the harnesses 13 led out from the terminals 12 of the planar antenna 1 to be received in the storage spaces 20a to 20c.

For example, as the storage spaces 20a, 20b for receiving the harnesses 13 of the antenna elements 1a, 1b, vertically extending concave portions may be formed in upper and lower portions of the padding member 20 which are adjacent a bulged portion of the padding member 20 which is to constitute the bank section of the seat back and, as the storage space 20c for receiving the harness 13 of the antenna element lc, a rectangular shaped concave portion may be formed along a vertically extending groove 20d of the padding member 20 which is to be used for tensioning the trim cover. Through-holes 20e which allows the couplers 14 to be led backward of the padding member 20 are formed in bottoms of the storage spaces 20a to 20c (only one through-hole 20e formed in the bottom of the storage space 20c is shown in FIGS. 4 and 5).

As discussed above, the third wadding members 23a to 23c for covering the storage spaces in a condition where the accessories are received in the storage spaces are formed of urethane slabs or the like, and formed separately from the first wadding member 22b. The third wadding members 23a, 23b, 23c are mounted to the padding member 20 so as to cover the storage spaces 20a, 20b, 20c, so that the shapes of the storage spaces can be retained by the third wadding members 23a to 23c. Moreover, like the second wadding members 21a to 21c, the third wadding members 23a to 23c are combined with corresponding thin portions of the first wadding members 22b.

Figure 6:
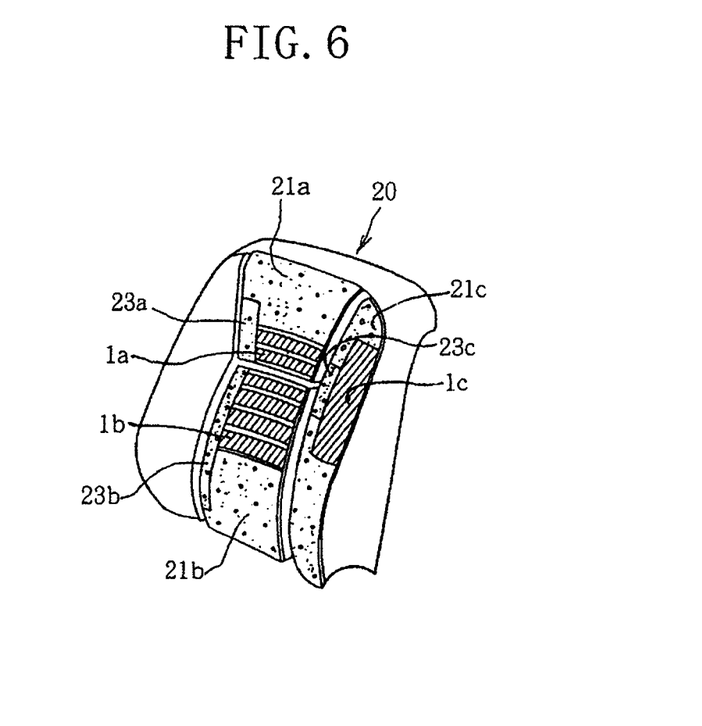
FIG. 6 is a schematic perspective view of the padding member on which the planer antenna is provided.

Referring to FIG. 6, the mounting of the antenna elements 1a to 1c to the seat back will be discussed hereinafter. The antenna elements 1a to 1c are fixedly bonded through the antenna base cloths onto surfaces of the corresponding second wadding members 21a to 21c. The second wadding members 21a, 21b, 21c are respectively bonded onto the upper portion, lower portion, and bulged portion of the padding member 20. Thus, the planar antenna 1 (1a to 1c) can be easily provided so as to be positioned with respect to the padding member 20 with high accuracy.

As shown in FIG. 1, the harnesses 13 of the antenna elements 1a to 1c (only first antenna element 1a is shown in FIG. 1) bonded onto the second wadding members 21a, 21b, 21c (only second wadding member 21a is shown in FIG. 1) which are bonded onto the padding member 20 are bent downward from the terminals 12 and received in the storage spaces 20a, 20b, 20c of the padding member 20 (only storage space 20a which is provided in the upper portion of the padding member 20 is shown in FIG. 1). The couplers (not shown) of the planar antenna 1 are then led backward of the padding member 20 through the through-holes (not shown) formed in the bottoms of the storage spaces 20a to 20c. Thus, the couplers may be connected to any external wirings. After the harnesses 13 are received in the storage spaces and the couplers are led backward of the padding member 20 through the through-holes, the third wadding members 23a, 23b, 23c are disposed adjacent corresponding second wadding members 21a, 21b, 21c so as to cover corresponding storage spaces and are then bonded on the padding member 20, whereby downward bent portions of the harnesses 13 are interposedly held between the second and third wadding members. Thus, the shapes of the storage spaces are retained by the third wadding members 23a, 23b, 23c.

Figure 7:
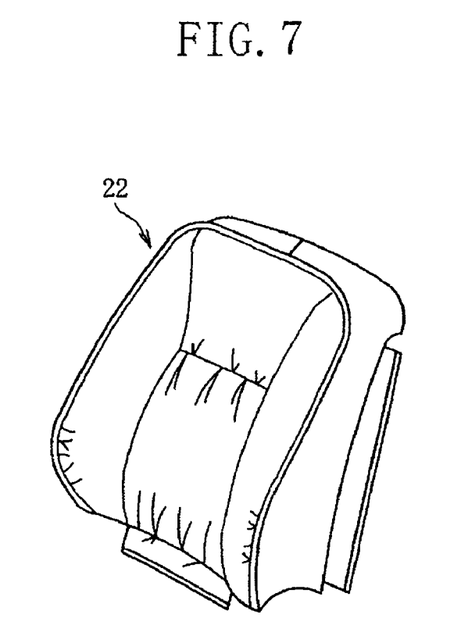
FIG. 7 is a schematic perspective view of the padding member of FIG. 6 which is covered by a trim cover.

After the third wadding members are bonded onto the padding member 20, the padding member is covered by the trim cover 22, as shown in FIG. 7, in such a manner that the second and third wadding members on the padding member 20 are combined with the thin portions of the first wadding member laminated with the covering sheet 22. Thus, the entire wadding material layer of the trim cover 22 which has a substantially uniform thickness is formed and the antenna elements are interposedly held between the first wadding member 22b of the trim cover 22 and the padding member 20 through the second wadding members 21a, 21b, 21c.

In the seat provided with the planar antenna, which is constructed as discussed above, the antenna elements 1a, 1b, 1c can be positioned with respect to the padding member 20 by the second wadding members 21a to 21c with high accuracy. In addition, the wadding material layer of the trim cover 22 which has the general thickness comprises the first wadding member 22b laminated with the covering sheet 22a of the trim cover 22, the second wadding members 21a to 21c, and the third wadding members 22a to 23c, so that the antenna elements 1a to 1c can interposedly held between the first and second wadding members and arranged close to the surface of the seating surface section of the seat. Moreover, the entire wadding material layer of the trim cover which is formed by causing the thin portions of the first wadding member 22b laminated with the cover sheet 22a to be combined with the second wadding members 21a to 21c and the third wadding members 23a to 23c has the substantially uniform thickness, so that according to the present invention, a comfortable seating feeling equivalent to that given by a seat which is not provided with the electric or electronic equipment can be given to the occupant who has sat on the seat according to the present invention.

More particularly, the second and third thick wadding members bonded onto the padding member are combined with the thin portions of the first wadding member laminated with the covering sheet, to thereby form the wadding material layer of the trim cover, so that the mounting positions of the antenna elements 1a to 1b can be made close to the surface of the seating surface portion. Even in this case, the entire wadding material layer of the trim cover 22 has the substantially uniform thickness, so that the comfortable seating feeling equivalent to that given by the seat which is not provided with the electric or electronic equipment can be given to the occupant.

In addition, the third wadding members 23a to 23c are bonded onto the padding member 20 so as to cover the storage spaces 20a to 20c of the padding member 20 within which the harnesses 13 led from the terminals 12 of the antenna elements 1a to 1c are received, so that the shapes of the storage spaces 20a to 20c can be retained by the third wadding members 23a to 23c. Therefore, even if the accessories of the electric or electronic equipment are combined with the padding member 20, the combination of the accessories and the padding member will not give a feeling of physical disorder to the occupant who has sat on the seat. In addition, there are no limitations to an installation location of the electric or electronic equipment and the thickness of the wadding material layer.

Figure 8:
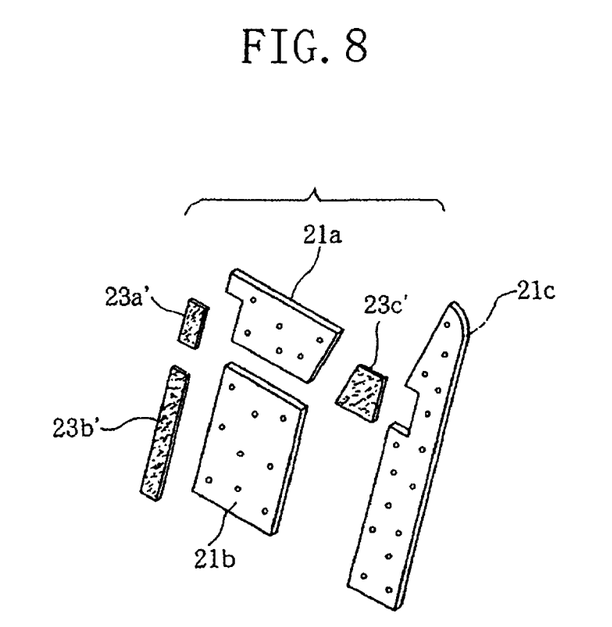
FIG. 8 is a schematic perspective view showing the second wadding members and a modification of the third wadding members.
Figure 9:
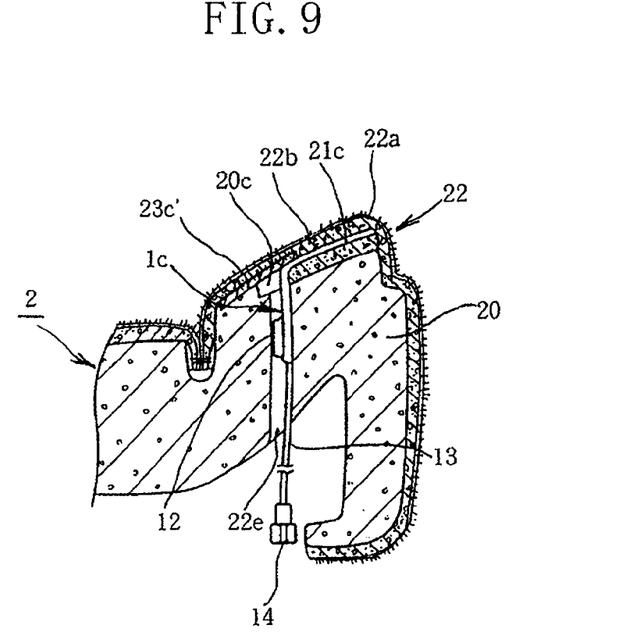
FIG. 9 is a schematic fragmentary sectional view of a seat which employs the modification and in which a storage space provided in a bulged portion of the padding member for storing an accessory of the electric or electronic equipment is covered by the third wadding member of FIG. 8 and the shape of the storage space is retained by the third wadding member.
Figure 10:
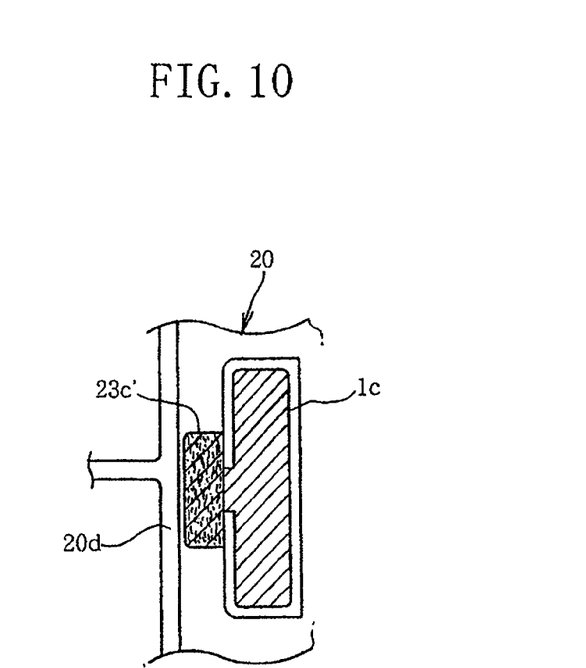
FIG. 10 is a schematic fragmentary plan view of the padding member of the seat of FIG. 9, in which the third wadding member of FIG. 9 is bonded onto the padding member so as to cover the storage space.

In lieu of the third wadding members 23a to 23c for covering the storage spaces 20a to 20c, there may be employed tapes 23a' to 23c' of non woven fabric which are shown in FIG. 8 and are less elongated or deformed even if any forces are applied to them. As shown in FIGS. 9 and 10, the non woven fabric tapes 23a' to 23c' (only one non woven fabric tape 23c' which is bonded onto the bulged portion of the padding member 20 is shown in FIGS. 9 and 10) are bonded onto the padding member 20 so as to cover the storage spaces 20a to 20c (only storage space 20c which is formed in the bulged portion of the padding member 20), whereby the shapes of the storage spaces 20a to 20c can be retained by the non woven fabric tapes 23a' to 23c'.

As discussed above, the non woven fabric tapes 23a' to 23c' which are less elongated are boned onto the padding member 20 so as to cover the storage spaces 20a to 20c within which the harnesses 13 of the antenna elements 1a to 1c are received, whereby the shapes of the storage spaces 20a to 20c can be retained by the non woven fabric tapes 23a' to 23c'. Therefore, like the case where the third wadding members 23a to 23c are employed, the combination of the non woven fabric tapes 23a' to 23c' and the padding member 20 will not give a feeling of physical disorder to the occupant who has sat on the seat. In addition, there are no limitations to an installation location of the electric or electronic equipment and the thickness of the wadding material layer.

Incidentally, while the case where the planar antenna is employed as an electric or electronic equipment body in the embodiment has been discussed above, the present invention may be widely applied to a seat provided with a heater or other planar components.

INDUSTRIAL APPLICABILITY

As discussed above, according to the seat of the present invention, which is provided with the electric or electronic equipment, the planar equipment bodies are interposedly held between the first wadding member and the second and third wadding members which constitute the wadding material layer of the trim cover which has the general thickness, whereby the mounting locations of the planar equipment bodies can be made close to the surface of the seating surface portion of the seat. Moreover, the entire wadding material layer of the trim cover has the substantially uniform thickness, so that the comfortable seating feeling equivalent to that given by the seat which is not provided with any electric or electronic equipment can be given to the occupant.

Moreover, the accessories of the electric or electronic equipment are stored in the storage spaces which are provided in the padding member so as to be made concave, and the wadding members or non woven fabric tapes for covering the storage spaces are bonded onto the padding member so as to cover the storage spaces, to thereby retain the shapes of the storage spaces, so that the storage spaces will not give a feeling of physical disorder to the occupant who has sat on the seat.

What is claimed is:

1. A seat provided with electric or electronic equipment, comprising:
    a trim cover;
    said trim cover comprising a sheet of covering material and a wadding layer;
    a padding member covered with said trim cover;
    a seating surface section formed by a portion of said trim cover and a portion of said padding member; and
    electric or electronic equipment;
    said electric or electronic equipment comprising planar equipment bodies and accessories;
    said planar equipment bodies having predetermined areas;
    said wadding layer comprising a first wadding member and second wadding members formed separately from said first wadding member;
    said first wadding member being laminated onto the entire sheet of covering material;
    said second wadding members having areas substantially corresponding in size to said predetermined areas of said planar equipment bodies;
    said second wadding members being mounted to first predetermined regions of said portion of the padding member which forms said seating surface section in cooperation with said portion of said trim cover;
    said planar equipment bodies being disposed on said second wadding members; and
    said padding member being covered by said trim cover in such a manner that said second wadding members having said planar equipment bodies disposed thereon are combined with said first wadding member, so that said planar equipment bodies are interposedly held between said first wadding member and said second wadding members.

2. A seat provided with electric or electronic equipment, according to claim 1, wherein said second wadding members are formed relatively thickly, and said first wadding member is formed so as to have relatively thin portions, said second wadding members being combined with said relatively thin portions of said first wadding member, so that said planar equipment bodies are interposedly held between said second wadding members and said relatively thin portions of said first wadding member.

3. A seat provided with electric or electronic equipment, according to claim 1 or 2, wherein said padding member has storage spaces formed in predetermined regions of said portion thereof forming said seating surface section in corporation with said portion of said trim cover, said storage spaces being formed so as to be made concave, said accessories are received within said storage spaces, and said wadding layer further includes third wadding members for covering said storage spaces, said third wadding members being bonded onto second predetermined regions of said portion of said padding member so as to cover said storage spaces within which said accessories have been received, to thereby retain shapes of said storage spaces.

4. A seat provided with electric or electronic equipment, according to claim 3, wherein said third wadding members are formed separately from said first wadding member and combined with said first wadding member.

5. A seat provided with electric or electronic equipment, according to claim 1 or 2, wherein said padding member has storage spaces formed in second predetermined regions of said portion thereof forming said seating surface section in corporation with said portion of said trim cover, said storage spaces being formed so as to be made concave, said accessories are received within said storage spaces, and said wadding layer further includes third wadding members for covering said storage spaces, said third wadding members comprising tapes of non woven fabric, said non woven fabric tapes being bonded onto said second predetermined regions of said portion of said padding member so as to cover said storage spaces within which said accessories have been received, to thereby retain the shapes of said storage spaces.

* * * * *